United States Patent [19]

Lindemann et al.

[11] Patent Number: 5,177,128

[45] Date of Patent: * Jan. 5, 1993

[54] PAPER COATING COMPOSITION

[75] Inventors: Martin K. Lindemann, Greenville; Kim Deacon, Rockhill, both of S.C.

[73] Assignee: Sequa Chemicals, Inc., Chester, S.C.

[*] Notice: The portion of the term of this patent subsequent to Oct. 7, 2003 has been disclaimed.

[21] Appl. No.: 306,491

[22] Filed: Feb. 6, 1989

Related U.S. Application Data

[63] Continuation of Ser. No. 911,081, Sep. 24, 1986, abandoned, which is a continuation-in-part of Ser. No. 753,685, Jul. 10, 1985, Pat. No. 4,616,057.

[51] Int. Cl.$^5$ .............................................. C08F 2/16
[52] U.S. Cl. ..................................... 524/44; 524/45; 524/458
[58] Field of Search ........................... 524/44, 45, 458

[56] References Cited

U.S. PATENT DOCUMENTS

| | | | |
|---|---|---|---|
| 2,392,585 | 1/1946 | Fryling | 524/458 |
| 2,460,300 | 2/1949 | Le Fevre et al. | 260/86.5 |
| 2,754,280 | 7/1956 | Brown et al. | 525/329.6 |
| 3,073,791 | 1/1963 | Barnknoff | 260/29.6 |
| 3,144,426 | 8/1964 | Burke, Jr. et al. | 260/29.7 |
| 3,236,798 | 2/1966 | Dunnavant et al. | 524/458 |
| 3,256,233 | 6/1966 | Hahn et al. | 260/29.6 |
| 3,296,176 | 1/1967 | Fantl | 260/29.6 |
| 3,397,165 | 8/1968 | Goodman et al. | 260/29.7 |
| 3,426,101 | 2/1969 | Ryan et al. | 260/876 |
| 3,438,926 | 4/1969 | Burke, Jr. et al. | 260/29.7 |
| 3,657,172 | 4/1972 | Gallagher et al. | 260/29.6 |
| 3,671,610 | 6/1972 | Amagi et al. | 260/880 R |
| 3,732,184 | 5/1973 | Lindemann et al. | 526/87 |
| 3,812,205 | 5/1974 | Dunkelberger | 260/885 |
| 3,817,880 | 6/1974 | Kreider | 260/2.5 |
| 3,833,404 | 9/1974 | Sperling | 117/63 |
| 4,118,357 | 10/1978 | Brabetz | 260/29.6 |
| 4,119,746 | 10/1978 | Bleyle | 524/458 |
| 4,122,136 | 10/1978 | Korte et al. | 260/898 |
| 4,133,788 | 1/1979 | Sahajpal et al. | 524/458 |
| 4,244,845 | 1/1981 | Woo | 524/458 |
| 4,254,004 | 3/1981 | Abbey | 524/458 |
| 4,263,193 | 4/1981 | Sakimoto et al. | 260/29.6 RB |
| 4,265,977 | 5/1981 | Kawamura et al. | 428/511 |
| 4,302,553 | 11/1981 | Frisch et al. | 525/28 |
| 4,325,856 | 4/1982 | Ishikawa et al. | 523/201 |
| 4,336,177 | 6/1982 | Backrouse et al. | 523/201 |
| 4,409,355 | 10/1983 | Heimberg | 524/458 |
| 4,427,836 | 1/1984 | Kowalski et al. | 525/301 |
| 4,448,923 | 5/1984 | Reeb et al. | 524/460 |
| 4,448,924 | 5/1984 | Reeb et al. | 524/460 |
| 4,459,378 | 7/1984 | Ugelstad | 523/205 |
| 4,468,498 | 8/1984 | Kowalski et al. | 525/301 |
| 4,468,499 | 8/1984 | Siegfried et al. | 525/301 |
| 4,469,825 | 9/1984 | Kowalski | 523/201 |
| 4,513,118 | 4/1985 | Suetterlin et al. | 525/81 |
| 4,530,956 | 7/1985 | Ugelstad | 524/458 |
| 4,539,361 | 9/1985 | Siol et al. | 524/460 |
| 4,569,954 | 2/1986 | Lee et al. | 524/460 |
| 4,616,057 | 10/1986 | Lindemann et al. | 525/903 |
| 4,814,373 | 3/1989 | Frankel et al. | 524/457 |

FOREIGN PATENT DOCUMENTS

| | | |
|---|---|---|
| 0103113 | 3/1974 | European Pat. Off. |
| 0187505 | 7/1986 | European Pat. Off. |
| 0173789 | 12/1986 | European Pat. Off. |
| 2055978 | 5/1971 | Fed. Rep. of Germany |
| 2351136 | 9/1977 | France |
| 49-15061 | 4/1974 | Japan |

OTHER PUBLICATIONS

"Rupture of Anomalous Composite Particles Prepared by Seeded Emulsion Polymerization In Aging Period", J. Polymer Sci.: Polymer Letters Edition, vol. 18, 481-486 (1980), M. Okubo et al.

"A Comparative Study of Semi-2 And Full Interpenetrating Polymer Network Based on Poly(n-Butyl Acrylate)/Polystyrene", J. of Appl. Polymer Sci., vol. 26, 3513-3525 (1982), J. Widmaier et al.

L. H. Sperling, D. A. Thomas, J. E. Lorenz, E. J. Nagel—Journal of Applied Polymer Science, vol. 19, pp. 2225-2233 (1975), "Synthesis and Behavior of Poly(vinyl Chloride)-Based Latex Interpenetrating Polymer Networks".

L. H. Sperling, Tai-Woo Chiu, R. G. Gramlich, D. A. Thomas—Journal of Paint Technology Reprint, vol. 46, No. 588, Jan. 1974, Synthesis and Behavior of Prototype "Silent Paint", pp. 47-53.

L. H. Sperling, Tai-Woo Chiu, C. P. Harman, D. A. Thomas—Intern. J. Polymeric Mat., 1972, vol. 1, pp. 331-341, "Latex Interpenetrating Polymer Networks".

L. H. Sperling, "Interpenetrating Polymer Networks and Related Materials", 1977, J. Polymer Sci., vol. 12, 141-180.

A. J. Curtivs et al, "Polybutadiene/Polystyrene Interpenetrating Polymer Networks", 1972, Polymer Eng. & Science, vol. 12, No. 2, 101-108.

Sperling et al, "Glass Transition Behavior of Latex Interpenetrating Polymer Networks Based on Methacrylic/Acrylic Pairs", 1973, J. Appl. Pol. Sc., vol. 17 2443-2455.

M. Markis et al, "Properties and Structure of Elastomeric Two-Stage Emulsion Interpenetrating Networks", 1985, Polymer, vol. 26, Aug. (Conference issue), 1359-1364.

Primary Examiner—Joseph L. Schofer
Assistant Examiner—N. Sarofin
Attorney, Agent, or Firm—Mitchell D. Bittman

[57] ABSTRACT

A paper coating composition is prepared containing a polymer emulsion which comprises a first polymer network which is intertwined on a molecular scale with a second polymer network.

14 Claims, No Drawings

PAPER COATING COMPOSITION

RELATED APPLICATIONS

This is a continuation of application Ser. No. 911,081, filed Sep. 24, 1986 abandoned, which is a continuation-in-part of application. Ser. No. 753,685, filed Jul. 10, 1985, now U.S. Pat. No. 4,616,057.

BACKGROUND OF THE INVENTION

This invention relates to a process for preparing a polymer emulsion containing colloidally suspended therein an interpenetrating polymer network wherein a first polymer network is intertwined on a molecular scale with a second polymer network and optionally additional polymer networks. The polymer emulsion of this invention is useful as a binder of fibers or fabrics, especially fiberfill.

Fiberfill is a generic term used to describe a variety of nonwoven fabrics for a variety of end uses. The common feature of all fiberfill products is a measure of loft or thickness in the fabric. This loft is a characteristic of value because it imparts insulation to outerwear and bed quilt stuffing, cushioning in furniture padding, dust holding capacity to filter media and resiliency to scrubbing pads. The most common construction of a fiberfill product is a loosely garnetted, cross-lapped or air laid web of 6 to 30 denier polyester staple fibers which is bonded (locked in its particular fiber arrangement) by an emulsion polymer binder. Fiberfill products can be made with other fibers, e.g. polyamide, cellulose acetate, rayon, glass, alone or in blends with each other. Some fiberfill is sold without a bonding agent but the material will lack durability, tensile strength and resiliency when compared to a bonded product. Bonding methods other than emulsion polymers, such as needle punching, and meltable fibers and powders are also used, but the polymer emulsion method produces the optimum strength/loft ratios for the majority of fiberfill markets.

The polymer emulsion product used as the binder is usually one of the following chemical types: polyvinylacetate, acrylic copolymers, styrene-butadiene copolymers or polyvinylchloride. Polyvinylacetate is the most common binder and in recent years it has been made white enough and strong enough to replace most of the acrylic polymer traditionally used. Polyvinylchloride is used where flame resistance is of prime concern and styrene-butadiene copolymers are used for special rubbery applications.

The characteristic of initial loft is unaffected by the chemical type of the binder used. However, initial loft is not the loft of value. Fiberfill products in their normal use are compressed, reducing the initial loft, and released many times. The true value of loft is how thick the fiberfill web is after repeated compression/recovery cycles. One drawback of current polymer bonded fiberfill technology is that temperatures over 100° F. will soften the binder and cause the fiberfill product to permanently lose loft if it is compressed at this elevated temperature. Temperatures of up to 180° F. are encountered in the shipping and use of many fiberfill products. Typically a fiberfill product, which may lose only 15% of its initial loft if compressed and released at 80° F., will lose more than 80% of its loft if tested the same way at only 120° F. Higher temperatures are expected to even more dramatically damage this loft recovery.

In the preparation of a coated cellulosic web, e.g. a paper web, there is used a pigment, such as clay or the like, sometimes with other materials such as, for example, a soluble pyrophosphate which may act to disperse the pigment in water and stabilize the pigment in water. This mixture, commonly termed a pigment "slip" or, since it usually contains clay, a clay "slip", is then compounded with a binder or adhesive material to produce a composition known in the art as a coating "color", which is useful for coating a cellulose web, e.g. a paper or paperboard web. Substantial quantities of the binder are used, and, accordingly, the composition and characteristics of the binder are of great importance in determining the qualities of the finished coated web. It is important that the binder contributes to the coating or the finished coated web a high degree of brightness, smoothness and gloss, and a good finish and feel after calendering. In addition to these basic qualities required in coatings, the coating color must flow smoothly and evenly so that it can be applied to the cellulosic web at sufficiently high speeds to be economical in ordinary coating processes; and the coating must have high strength, to permit subsequent printing on the coated paper without "picking," i.e. it must have good "pick" characteristics.

Polymer emulsions are useful as a coating binder for paper and paperboard. Paper is coated to provide a smoother surface with increased strength, whiteness and absorbability in order to provide a better surface on which to print. Coating formulations for paper and paperboard can contain a variety of binders including all-latex binders, protein-latex binders, all-starch binders or latex-starch blends. The end use of the paper and, in particular, the method by which it will be printed, may determine which binder type is used in the coating. The major printing method is the offset method in which both water (fountain solution) and an oil based ink are applied to the paper coating. The rate of absorption of the water layer and the ink into the coating is critical to producing a desirable high quality printing.

Styrene-butadiene copolymers are commonly used latex binders, followed by polyvinylacetate, vinylacetate-acrylic copolymers, ethylene-vinylacetate copolymers and all acrylic polymer emulsions. Styrene-butadiene and vinylacetate binders are widely used because of their low cost. The major drawback of styrene-butadiene binders is the poor water absorption giving high SIWA brightness values. High SIWA (simultaneous ink and water absorption test) brightness values mean the coating did not absorb the initially applied water layer and the subsequent ink application failed to penetrate this layer and absorb into the coating. The incomplete ink coverage produces a weak or spotty image. Vinyl acetate binders are often too water absorbent, resulting in press roll fountain solution milking. This problem is the converse of the high SIWA brightness problem. Fountain solution milking occurs when the coating absorbs so much water (fountain solution), that the coating becomes solubilized in the fountain solution and the binder and clay so dissolved give the solution a "milky" appearance. This condition can be predicted by the Adams Wet Rub Test.

The polymer emulsion prepared by the process of this invention provides a binder compound for fiberfill which provides improved resiliency and loft recovery to the bonded fiberfill products. This polymer emulsion is useful in bonding textile fibers in a fiberfill product or in any nonwoven product or even any traditional woven or knitted textile fabric. The polymer emulsion can also be used in a coating, especially as a coating binder for paper and paperboard. Other types of coatings in which the polymer emulsion would be useful include various industrial coatings such as maintenance coatings (e.g. for metal tanks, pipelines and other metal structures), coil coatings, can coatings, appliance coatings (e.g. for refrigerators, washing and drying machines), wood coatings (e.g. wood panels or furniture), floor coatings and sealers (e.g. floor polishes), automotive coatings (e.g. primers, top coats), leather coatings, concrete sealers and coatings, marine coatings, as well as trade sale coatings such as house paints, both exterior and interior.

SUMMARY OF THE INVENTION

Briefly, the present invention provides a process for preparing a polymer emulsion containing an interpenetrating polymer network by forming a first polymer emulsion, mixing a second monomer emulsion with the first polymer emulsion, allowing the emulsion mixture to equilibrate and polymerizing the emulsion mixture providing a first polymer network which is intertwined on a molecular scale with the second polymer network. This polymer emulsion is useful in coatings, particularly as a coating binder for paper and paperboard as well as for industrial coatings and trade sale coatings.

DETAILED DESCRIPTION OF THE INVENTION

The aqueous polymer emulsion containing an interpenetrating polymer network is prepared by forming a first polymer emulsion. The first polymer emulsion can be prepared by conventional batch, semi-continuous or continuous polymerization procedures. These are taught, for example in U.S. Pat. Nos. 2,754,280, 2,795,564, 3,732,184 and in the book entitled "The Applications of Synthetic Resin Emulsion" by H. Warson, Ernest Benn Limited, London, 1972, pp. 85 to 132. The first polymer emulsion can be formed by polymerizing a monomer or a mixture of monomers (herein called a first monomer) with an active crosslinking agent. Alternatively the first polymer emulsion can be formed by emulsifying a polymer. Examples of emulsified polymers include polyethylene emulsions, polyester emulsions, polyurethane emulsions and the like.

The first polymer emulsion is mixed with a second monomer emulsion and then the emulsion mixture is allowed to equilibrate. By equilibration is meant allowing sufficient time for the second monomer to become absorbed into the first polymer. The mixing and equilibration allows the second monomer emulsion to be thoroughly mixed and dispersed throughout the first polymer emulsion on a molecular scale. The second monomer emulsion can be added either as an emulsion or as a monomer or mixture of monomers which will emulsify during mixing with the first polymer emulsion.

Then, after thorough mixing and equilibration the emulsion mixture is polymerized providing a first polymer network which is intertwined on a molecular scale with the second polymer network, i.e. an interpenetrating polymer network is formed. Optionally, a third monomer emulsion can then be mixed in, equilibrated, followed by polymerization or further additional monomer emulsions can likewise be intertwined in the polymer networks. When the polymer emulsion is subsequently applied, dried and heated the physical and chemical bonding of the first polymer network with the second polymer network is completed.

Because of the interpenetrating network formed, desirable physical properties are achieved. Dual Tg (glass transition temperature) properties have been observed wherein the polymer has the Tg of both the first polymer and the second polymer. This is especially useful in the application of the polymer emulsion wherein modulus, tensile strength and desirable film forming properties can be adjusted by varying the ratio of the first and second polymers comprised in the interpenetrating network. Because the first and second networks are intertwined on a molecular scale higher tensile strength has been observed as well as higher modulus and higher impact strength at temperatures intermediate the Tg's of the first polymer and the second polymer.

The monomers which are polymerized in accordance with the present invention are vinyl monomers, ethylenically unsaturated compounds. Examples of monoethylenically unsaturated monomers are: vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl ester (e.g. Versatic Acid-TM, a branched carboxylic acid, marketed by the Shell Oil Corporation), vinyl laurate, and vinyl stearate; also alpha-olefins, such as ethylene, propylene, butylene, isobutylene, and pentene and the like; also maleate, fumarate, and itaconate esters of $C_1$-$C_8$ alcohols, such as dibutyl maleate, dibutyl fumarate, dibutyl itaconate; also alkyl acrylates with an alkyl group having from 1 to 18 carbon atoms, such as methyl, ethyl, n-butyl, sec-butyl, the various isomeric pentyl, hexyl, heptyl, and octyl (especially 2-ethylhexyl), lauryl, cetyl, stearyl and like groups; also alkyl esters of methacrylic acid with an alkyl group having from 1 to about 18 carbon atoms, such as methyl, ethyl, propyl, n-butyl, n-hexyl, 2-ethylhexyl, n-octyl, lauryl, cetyl, stearyl and like groups; also vinyl alkyl ethers, having an alkyl group with 1 to 18 carbon atoms, such as methyl vinyl ether, ethyl vinyl ether, butyl vinyl ether and stearyl vinyl ether. Examples of monomers also include diene monomers, such as butadiene, chloroprene, and isoprene and similar compounds. Other monomers include aromatic vinyl monomers, such as styrene, alphamethylstyrene, vinyl toluene, 2-bromostyrene, and p-chlorostyrene; also acrylonitrile; also vinyl halide monomers, such as vinyl chloride and vinylidene chloride; also benzyl acrylate and t-butyl acrylate; also vinyl esters of aromatic acids, such as vinylbenzoate.

Preferably the polymer present in the first polymer emulsion is either polymethyl methacrylate, polyvinyl acetate, polybutylacrylate, vinylchloride ethylene copolymer, vinylacetate ethylene copolymer, polystyrene or polyacrylonitrile or copolymers of these with other monomers mentioned above, while the second polymer differs from the first polymer and preferably is based upon a monomer such as acrylo nitrile, methyl methacrylate, butyl acrylate, styrene or mixtures thereof.

In order to obtain desirable dual Tg properties, the polymer in the first polymer emulsion and the polymer derived from the second monomer emulsion can be chosen so, for example, one has a Tg greater than the other. Different pairs of polymers can be chosen to exhibit useful properties over different temperature ranges. For example, because of polystyrene's higher Tg, upon interpenetrating a polyvinyl acetate network it will extend the modulus and reduce distortion of the matrix at elevated temperatures.

In general, the various combinations of monomers can be chosen for the first polymer emulsion or the second monomer emulsion. However, the monomer chosen for the first monomer emulsion cannot be an inhibitor to or retard the polymerization of the monomer in the second monomer emulsion. Since acrylonitrile is an inhibitor to the polymerization of vinyl acetate, the vinyl acetate must be in the first polymer emulsion while the acrylonitrile is in the second monomer emulsion. Thus, in a preferred embodiment, the first polymer emulsion contains polyvinyl acetate, vinylacetate-ethylene copolymer or vinylacetate-butylacrylate copolymer, while the second monomer emulsion contains either styrene, methyl methacrylate, acrylonitrile or butylacrylate, or mixtures thereof.

When the resultant polymer emulsion is to be used in a coating, preferred polymer combinations include wherein the first polymer network contains either a polyvinylacetate, a vinylacetate-ethylene copolymer, a vinylchloride ethylene copolymer, a polyvinyl propionate or a vinylacetate-acrylic copolymer (preferably where the acrylic comonomer is a methyl, ethyl, butyl or 2-ethyl hexyl acrylate) and wherein the second polymer network contains either polystyrene, an acrylonitrile-acrylate copolymer, a styrene-butadiene copolymer or a styrene acrylic copolymer. In a preferred polymer combination the first polymer contains an ethylene-vinylacetate copolymer and the second polymer contains polystyrene, preferably at level of 5 to 40% on a solids by weight basis of the emulsion.

The process of the present invention provides an interpenetrating network of polymers which are generally physically incompatible in that the polymers are not soluble in one another. In addition, this process provides a means of combining polumers which cannot readily be formed by copolymerization of their monomers. For example, vinyl acetate and styrene cannot generally be copolymerized and mixing or blending of the two polymers in emulsion form does not result in a polymer having desirable properties (e.g. poor pick strength).

The first polymer emulsion and optionally the second monomer emulsion contain an active crosslinking agent. By the term "active crosslinking agent" is meant a functional monomer whic immediately provides crosslinking and branching of the polymer during the initial formation of the emulsion polymer (i.e. during the polymerization step) to increase the molecular weight of the emulsion polymer. Subsequent drying or other curing techniques are not required for the crosslinking and branching of the emulsion polymer by the active crosslinking agent. Monomers of this type generally comprise compounds which contain 2 to 5 ethylenically unsaturated groups in one molecule separated by an ester of ether group, or by an aromatic or nitrogenous ring structure, where the unsaturated groups are capable of undergoing addition polymerization by free radical means. Suitable active crosslinking agents include alkylene glycol diacrylates and methacrylates, such as ethylene glycol diacrylate, 1,3-butylene glycol diacrylate, propylene glycol diacrylate, triethylene glycol dimethacrylate etc., 1,3-glycerol dimethacrylate, 1,1,1-trimethylol propane dimethacrylate, 1,1,1-trimethylol ethane diacrylate, pentaerythritol trimethacrylate, sorbitol pentamethacrylate, methylene bismethacrylamide, divinyl benzene, vinyl methacrylate, vinyl crotonate, vinyl acrylate, divinyl adipate; also di- and tri-allyl compounds, such as triallyl cyanurate, triallyl and isocyanurate, diallyl phthalate, allyl methacrylate, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent in the polymer emulsion of the present invention is from about 0.01 to 1.0 percent, preferably from about 0.05 to 0.25 percent by weight of the polymer.

The first polymer emulsion or the second monomer emulsion, preferably both, additionally contain a latent crosslinking agent. By the term "latent crosslinking agent" is meant a polyfunctional monomer wherein a portion of the functionality enters into the polymerization with other monomers in the polymer emulsion, with the residual functionality causing crosslinking of the polymer upon the subsequent application of energy generally by applying heat, e.g. by drying and curing of the latex particles, often in the presence of a catalyst, or by applying radiation. The latent crosslinking agent provides thermosetting characteristics to the polymer emulsion. Upon the subsequent application of energy the latent crosslinking agent forms an insoluble crosslinking network, with the crosslinking being triggered generally by heat or radiation after the polymer emulsion has been formed and applied. Examples of latent crosslinking agents are: N-alkylolamides of alpha, beta ethylenically unsaturated carboxylic acids having 3-10 carbons, such as N-methylol acrylamide, N-ethanol acrylamide, N-propanol acrylamide, N-methylol methacrylamide, N-ethanol methacrylamide, N-methylol malemide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1-8 carbon atoms, such as N-(methoxymethyl) acrylamide, N-(butyoxymethyl) acrylamide, N-(methoxymethyl) methacrylamide; N-methylol allyl carbamate and the N-alkoxymethyl derivatives such as N-(butyoxymethyl) allyl carbamate and N-(methoxymethyl) allyl carbamate and the like, and mixtures of these monomers with allyl carbamate, acrylamide or methacrylamide. Epoxy containing monoethylenically unsaturated compounds, such as glycidyl acrylate, glycidyl methacrylate and vinyl glycidyl ether function as latent crosslinking monomers often in conjunction with mono- and diethylenically unsaturated carboxylic acids, such as acrylic, methacrylic and itaconic acid, when catalyzed with an alkaline catalyst, such as potassium or sodium carbonate, diethylenetriamine and the like. Hydroxyethyl acrylate, hydroxypropyl acrylate and the corresponding methacrylates provide latent crosslinking when combined with N-alkylolamides of alpha, beta ethylenically unsaturated acids having 3-10 carbon atoms or with the acids themselves by ester formation. Another group of latent crosslinking monomers is described in U.S. Pat. Nos. 3,678,098 and 4,009,314. These are cationic chlorohydrin compounds having the following formula:

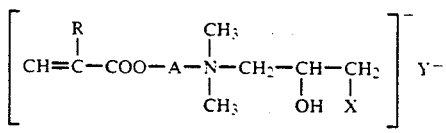

where R = methyl or H
A = alkylene    X, Y = halogen

The crosslinking reaction of these monomers is also catalyzed by the alkaline compounds mentioned above. The amount of latent crosslinking agent in the polymer of the present invention is about from 0.5 to 10 percent, preferably from about 2 to 6 percent by weight of the polymer.

The emulsions of the present invention are prepared in the presence of suitable anionic, cationic or nonionic emulsifiers or mixtures thereof. Optionally, protective colloids, illustrated by polyvinyl alcohol and hydroxyethyl cellulose, may also be present. Suitable nonionic emulsifying agents include alkylphenoxypolyethoxyethanols having alkyl groups of about 7 to 18 carbon atoms and 5 to 60 or more oxyethylene units, such as octylphenoxypolyethoxyethanols, methyloctylphenoxypolyethoxyethanols, nonylphenoxypolyethoxyethanols, dodecylphenoxypolyethoxyethanols; also ethylene oxide derivatives of long chained carboxylic acids, such as lauric, myristic, palmitic, oleic, and stearic acid, containing 5 to 60 oxyethylene units per molecule; also analogous ethylene oxide condensates of long-chained alcohols, such as octyl, decyl, lauryl, stearyl and cetyl alcohols, ethylene oxide derivatives of etherified or esterified polyhydroxy compounds having a hydrophobic component, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl, and cetyl alcohols, ethylene oxide derivatives of etherified or esterified polyhydroxy compounds having a hydrophobic hydrocarbon chain, such as sorbitan monostearate containing 10 to 60 oxyethylene units; also block copolymers of ethylene oxide and propylene oxide comprising a hydrophobic propylene oxide section combined with one or more hydrophilic ethylene oxide sections. Suitable anionic emulsifying agents include higher fatty alcohol sulfates, such as sodium lauryl sulfate, the alkylaryl sulfonates, such as the sodium salt of t-octylphenyl sulfonate, the sodium dioctyl sulfosuccinates, disodium fatty alkyl alkanolamide sulfosuccinate, and the ammonium salt of a sulfate or phosphate ester of an alkylphenoxy poly(ethyleneoxy) ethanol, where the oxyethylene content is from 3 to 30 moles per alkylphenol. Suitable cationic emulsifiers include N-dodecyl trimethyl ammonium chloride, and N-vinyl benzyl trimethyl ammonium chloride and the like. Generally, the polymer emulsions of this invention contain from 1 to 10 percent, preferably from 3 to 6 percent, emulsifiers based on the weight of the monomers (solids).

In one embodiment, in a polymerization process which can be used in making the first polymer emulsion of the invention an aqueous phase is prepared first containing water, a small portion of a nonionic emulsifier, sometimes also a mixture of anionic and nonionic emulsifiers, and a very small amount of ferrous sulfate, being a redox component in the catalyst system or the finishing catalyst system for the polymer emulsion. The aqueous phase is purged well with nitrogen, and heated to polymerization temperatures (e.g. 40° to 70° C.). A small portion of monomer (and redox component for certain systems such as vinylacetate-ethylene copolymers), is then added followed by a suitable amount of initial catalyst, most often from about 1 to 3 percent based on the weight of the initial monomer charge. Often it is advantageous to use potassium persulfate as the catalyst because the resulting polymer has better resistance to heat discoloration. But sodium or ammonium persulfates can also be used. After the emulsion polymerization has initiated, the rest of the monomers are gradually added to the reaction mixture, often emulsified in water together with the latent crosslinking agents and the active crosslinking agents. Generally, the gradual addition of the monomers is carried out over a time period of one to five hours. More catalyst solution (and redox component in certain systems) is also added gradually to maintain the polymerization reaction. Often cooling is applied to the reaction vessel by means of a waterbath to remove the excess heat of polymerization. Usually, a total of 0.2 to 1 percent of catalyst (and 0.2 to 1% of redox component in certain systems) based on the weight of the monomers, is added over the course of the emulsion polymerization. After all the monomer has been added optionally a small amount of an organic peroxide, such as t-butyl hydroperoxide and cumene hydroperoxide, and the like can be added for the finishing step, together with a small amount of a reducing agent, such as sodium metabisulfate, sodium formaldehyde sulfoxylate, zinc formaldehyde sulfoxylate and ascorbic acid. In place of an organic peroxide, hydrogen peroxide or persulfates, such as potassium, sodium or ammonium persulfates may also be used. The terminal catalyst necessary to finish the the reaction is generally about 10 to 30 percent by weight of the total amount of catalyst consumed during the reaction. The reducing agent is ordinarily added in the necessary equivalent amount. Normally no buffering agent is required to keep the pH between 3 and 5. If necessary, dilute ammonia or a dilute solution of sodium acetate or sodium bicarbonate may be added from time to time to adjust the pH within those limits. Others auxiliary agents may be added to the finished polymer emulsion, such as defoamers, biocides and the like.

After the first polymer emulsion is cooled a second monomer or mixture of monomers is introduced into the reactor, preferably as fast as possible. The second monomer can be either added as an emulsion to the first polymer emulsion or as a monomer or mixture of monomers which are emulsified during mixing with the first polymer emulsion. Water, emulsifier and a small amount of ferous sulfate (redox component) are also often added either with the second monomer or after equilibration.

Following thorough mixing and equilibration (e.g. 10 to 60 minutes) of the first polymer emulsion and second monomer emulsions a second polymerization step is initiated by the addition of catalyst solution and then the reducing solution.

The polymer emulsion of this invention generally contains from 5 to 95%, preferably 60 to 95% on a solids by weight basis of the first polymer emulsion and 5 to 40% on a solids by weight basis of the second polymer emulsion.

The polymer emulsions of the present invention are useful as binders, adhesives and coatings. These polymer emulsions when used as binders provide high temperature resiliency to bonded fiberfill products. The polymer emulsions are useful in bonding textile fibers in a fiberfill product or other nonwoven product or even in traditional woven or knitted textile fabrics. Generally, based on the weight of the fiberfill product the binder can comprise 2 to 50%.

The polymer emulsions of this invention are useful in coatings, particularly as a coating binder for paper and paper board. The coating containing the polymer emulsion can be used to provide a smoother surface and increased strength, whiteness and gloss to a paper or paperboard product. In addition to the polymer emulsion binder the coating can contain proteins, polyvinyl alcohol, alginates, resins or modified or unmodified starches as binders. Other conventional ingredients can be included in the coating such as pigments (including titanium dioxide and/or calcium carbonate), lubricants (e.g. calcium stearate), insolubilizers (e.g. glyoxal resins to crosslink starch), defoamers, biocides (to prevent mildew), preservatives and the like. Paper can be treated with the coating by a variety of coating techniques including size press, air knife coating, blade coating, gravure coating, puddle coating, spray or kiss roll. Some specialty papers apply polymer emulsions with or without fillers with these processes. The unique characteristics of these specialty papers can be enhanced and/or delivered at a lower cost by using the polymer emulsions of this invention.

EXAMPLE 1

A polymer emulsion is prepared as follows containing a polymer which is an interpenetrating network of polyvinyl acetate and polystyrene.

The following was charged to a 100 gal. (379 liter) stainless steel pilot reactor equipped with a variable agitator, temperature control system, feedpumps, means for purging the reactor with nitrogen, and a jacket for heating and cooling:

| Water | 140 lbs. (63.5 kg) |
| --- | --- |
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| Vinyl acetate | 26 lbs. (11.8 kg) |
| --- | --- |

This was followed by the addition of the initial catalyst solution:

| Water | 10 lbs. (4.5 kg) |
| --- | --- |
| Potassium persulfate | 8 oz. (227 g) |

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:

| Water | 58 lbs. (26.3 kg) |
| --- | --- |
| Emcol K8300 92) | 8 lbs. 8 oz. (3.9 kg) |
| Triton X 305 (1) | 2 lbs. 4 oz. (1.0 kg) |
| N-Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (%) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| Water | 75 lbs. (34 kg) |
| --- | --- |
| Potassium persulfate | 9 oz. (255 g) |

After 3½ hours, when all the first monomer emulsion and catalyst solution had been added to the reactor the following finishing catalyst solution was added:

| Water | 1 lbs. (.45 kg) |
| --- | --- |
| Potassium persulfate | 2 oz. (57 g) |

The temperature of the batch was maintained at 80° C. for an additional 30 minutes, after which the first polymer emulsion was cooled to 60° C. At this point a second monomer emulsion was introduced into the reactor, as fast as possible, in about 10 minutes, and mixed with the first polymer emulsion. The second monomer emulsion had been prepared before containing:

| Water | 50 lbs. (22.7 kg) |
| --- | --- |
| Emcol K8300 (2) | 3 lbs. (1.4 kg) |
| Triton X 305 (1) | 3 lbs. (1.4 kg) |
| N-Methylol acrylamide (49%) | 5 lbs. (2.3 kg) |
| Styrene | 100 lbs. (45.4 kg) |
| Ferrous sulfate | 1 gram |

The temperature of the reactor content was maintained at 60° C. and allowed to equilibrate (½ hour) while the reactor was again purged with nitrogen after which the following catalyst solution was added to the reactor:

| Water | 19 lbs. (8.6 kg) |
| --- | --- |
| Potassium persulfate | 1 lb. (0.5 kg) |
| t-butyl hydroperoxide | 8 oz. (227 g) |

The second polymerization step was initiated by adding half of the following reducing solution:

| Water | 16 lbs. (7.3 kg) |
| --- | --- |
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| Water | 4 lbs. (1.8 kg) |
| --- | --- |
| Zinc nitrate solution | 14 oz. (397 g) |

-continued

| | |
|---|---|
| in water (50%) | |
| Phosphoric acid | 7 oz. (198 g) | followed by a second post-add as follows:

| | |
|---|---|
| Water | 2 lbs. (0.9 kg) |
| Proxel GXL (4) | 1½ oz. (43 g) |
| Formaldehyde (37%) | 1½ oz. (43 g) |

A total of 55 lbs. (24.9 kg) of rinsewater was added to the emulsion for clean up of the pumps and lines.
Notes:
(1) Triton X 305 is a 70 percent solution in water of an octylphenoxypolyethoxyethanol containing 30 moles of oxyethanol per mole of octyl phenol. It is supplied by the Rohm & Haas Company.
(2) Emcol K8300 is a 40 percent solution in water of disodium fatty alkyl alkanolamide sulfosuccinate supplied by the Witco Chemical Company.
(3) Hydrosulfate AWC is a brand of sodium formaldehyde sulfoxylate supplied by the Diamond Shamrock Company.
(4) Proxel GXL is a biocide supplied by the ICI Company.
(5) JPS Sequesterant is a brand of diethylenetriamine pentaacetic acid supplied by the Intex Products Company.

The polymer emulsion thus obtained had the following properties:

| | |
|---|---|
| solids (30 min. at 130° C. drying) | 46.3% |
| pH | 3.5 |
| viscosity (Brookfield at 50 RPM) | 78 cps |
| intrinsic viscosity (measured in N-methyl pyrrolidone at (30° C.) (6) | 1.5 dl/g |
| particle size (by light transmission) (7) | 0.33 microns |

Notes:
(6) In measuring the intrinsic viscosity, a 1 ml sample of the polymer emulsion is added to 100 ml of N-methyl pyrrolidone, and the mixture is agitated and filtered. The flowtime of the solution so prepared is then compared at 30° C. with the flow time of the N-methyl pyrrolidone solvent using a Ubbelohde viscometer (obtained from the Cannon Instrument Company) the relative viscosity is the fraction obtained by dividing the flowtime of the solution by the flowtime of the solvent. The Huggins equation is then used to calculate the intrinsic viscosity from the relative viscosity measurement and from the polymer solids content in grams per 100 ml of solution. The use of the Huggins equation for intrinsic viscosity calculations is described in detail in the "Encyclopedia for Polymer Science and Technology", (Wiley, N.Y., 1971) Vol. 15, page 634.
(7) The particle size was measured by light transmission using a Beckman spectrophotometer (Spectronic 20). The method is described in detail in "Official Digest of the Paint and Varnish Industry", February 1959, pages 200-213.

EXAMPLE 2

A polymer emulsion is prepared containing a polymer which is an interpenetrating network of polyvinyl acetate and polymethyl methacrylate.

The following was charged to a 100 gal. (379 liter) stainless steel pilot reactor equipped with a variable agitator, temperature control system, feedpumps, means for purging the reactor with nitrogen, and a jacket for heating and cooling.

| | |
|---|---|
| Water | 140 lbs. (63.5 kg) |
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| | |
|---|---|
| Vinyl acetate | 26 lbs. (11.8 kg) |

This was followed by the addition of the initial catalyst solution:

| | |
|---|---|
| Water | 10 lbs. (4.5 kg) |
| Potassium persulfate | 8 oz. (227 g) |

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:

| | |
|---|---|
| Water | 58 lbs. (26.3 kg) |
| Emcol K8300 92) | 8 lbs. 8 oz. (3.9 kg) |
| Triton X 305 (1) | 2 lbs. 4 oz. (1.0 kg) |
| N-Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (5) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| | |
|---|---|
| Water | 75 lbs. (34 kg) |
| Potassium persulfate | 9 oz. (225 g) |

After 3½ hours, when all the first monomer emulsion and catalyst solution had been added to the reactor the following finishing catalyst solution was added:

| | |
|---|---|
| Water | 1 lb. (.45 kg) |
| Potassium persulfate | 1½ oz. (57 g) |

The temperature of the batch was maintained at 80° C. for an additional 30 minutes, after which the first polymer emulsion was cooled to 60° C. At this point a second monomer emulsion was introduced into the reactor as fast as possible, in about 10 minutes, and thoroughly mixed with the first polymer emulsion. The second monomer emulsion had been prepared before containing:

| Water | 50 lbs. (22.7 kg) |
|---|---|
| Emcol K8300 (2) | 3 lbs. (1.4 kg) |
| Triton X 305 (1) | 3 lbs. (1.4 kg) |
| N-Methylol acrylamide (49%) | 5 lbs. (2.3 kg) |
| Methyl methacrylate | 100 lbs. (45.4 kg) |
| Ferrous sulfate | 1 gram |

The temperature of the reactor content was maintained at 60° C. and allowed to equilibrate (about ½ hour), while the reactor was again purged with nitrogen after which the following catalyst solution was added to the reactor:

| Water | 19 lbs. (8.6 kg) |
|---|---|
| Potassium persulfate | 1 lb. (0.5 kg) |
| t-butyl hydroperoxide | 8 oz. (227 g) |

The second polymerization step was initiated by adding half of the following reducing solution:

| Water | 16 lbs. (7.3 kg) |
|---|---|
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| Water | 4 lbs. (1.8 kg) |
|---|---|
| Zinc nitrate solution in water 50% | 14 oz. (397 g) |
| Phosphoric acid | 7 oz. (198 g) | followed by a second post- add as follows:

| Water | 2 lbs. (0.9 kg) |
|---|---|
| Proxel GXL (4) | 1½ oz. (43 g) |
| Formaldehyde (37%) | 1½ oz. (43 g) |

A total of 60 lbs. (24.9 kg) of rinsewater was added to the emulsion for clean up of the pumps and lines.

The polymer emulsion thus obtained had the following properties:

| solids (30 min at 130° C. drying) | 45.0% |
|---|---|
| pH | 4.0 |
| viscosity (Brookfield at 50 RPM) | 32 cps |
| intrinsic viscosity (measured in N-methyl pyrrolidone at 30° C.) (6) | 2.3 dl/g |
| particle size (by light transmission) (7) | 0.27 microns |

EXAMPLE 3

A typical fiberfill product for quilt stuffing was constructed of 6 denier 2" staple length polyester fiber with garnetted and crosslapped webs to a weight of 4 oz./yd². This web was then spray bonded with a commercially available polyvinylacetate emulsion polymer (SUNCRYL RW 41SP from Sun Chemical Corporation), and the polymer emulsion as prepared in Examples 1 and 2, producing a final fiberfill product composed of 82% fibers and 18% bonding polymer.

The binder mix is prepared in a tank by diluting the emulsions with water to a 22% nonvolatile content. This mix is pumped with reciprocating airless pumps at a pressure of 300 psi and delivered through spray nozzles of 0.018 inch diameter which traverse the polyester fiber web. The polyester web is passed under the traversing sprays so as to achieve a uniform application of the bonding mix. The web and applied mix are passed through a forced air oven to remove the water and coalesce the binder polymer onto the fibers. The web is turned over and the process repeated on the back side. Finally the web is passed through the oven a third time to cure the binder, rendering it durable and resistant to water and solvent interactions.

The residual loft value was simulated by the following test. Ten inch by ten inch squares of the fiberfill material are cut and stacked vertically. The height of this stack is measured ($H_1$). The stack is then compressed by placing weights on top of the stack. A typical weight of 20 pounds usually reduces the initial stack height by 50 to 75%. The stack is left in this compressed state for a period of time (1 hour is typical) at a stated temperature and then the weight is removed. The stack of fiberfill is allowed to recover for a further period of time (10 minutes is typical) and the height is again measured ($H_2$). The % recovery is stated as a ratio of the final height to the initial height:

$$\frac{H_2}{H_1} \times 100 = \% \text{ recovery}$$

Table 1 shows % recovery values of a 6 layer stack compressed with 0.2 psi (20 lbs. on a 10"×10" square) for 16 hours and then allowed to recover for 1 hour at the stated temperatures.

TABLE 1

|  | Polyvinyl acetate | Example 2 | Example 1 |
|---|---|---|---|
| 72° F. | 85% | 85% | 85% |
| 110° F. | 37% | 46% | 59% |

Although all the binders are affected by temperature, the polyvinyl acetate bonded fiberfill loses more loft at 110° F. than the polymer emulsions of Examples 1 and 2.

EXAMPLE 4

A more detailed study was made of the binder utilizing the polymer emulsion prepared in Example 1 on a slightly different fabric, a 50/50 blend of 6 and 15 denier polyester. Web preparation and bonding were similar to Examples 3. Finished fiberfill weight for this furniture pad material was 18 oz./yd² with a fiber content of 81% and a binder content of 19%.

The same loft recovery test was conducted at 120° F. with compression for 6 hours under various compression loads and recovery measured both immediately and after 6 hours. Again the polymer of Example 1 shows considerably more loft recovery at this temperature under all compression loads as compared to a binder utilizing a polyvinyl acetate emulsion polymer (PVAc) as shown in Table 2.

TABLE 2

| Compression Loading | 0.02 psi | | 0.05 psi | | 0.15 psi | |
|---|---|---|---|---|---|---|
| polymer type | PVAc Example 1 | | PVAc Example 1 | | PVAc Example 1 | |
| immediate recovery | 69% | 77% | 55% | 68% | 14% | 27% |
| 6 hour recovery | 69% | 80% | 58% | 70% | 16% | 29% |

EXAMPLE 5

Ethylene-vinylacetate copolymer emulsions, Examples E and I, were prepared as follows:

The following was charged to a 10 gal. stainless steel pressure reactor equipped with a variable agitator set at 60 rpm, temperature control system, feedpumps, means for purging the reactor with nitrogen and pressurizing with ethylene, and an internal coil for heating and cooling:

|  | Example I | Example E |
|---|---|---|
| Water (deionized) | 7500 g. | 7500 g. |
| Emcol K8300 (2) | 120 g. | 120 g. |
| Triton X 405 (8) | 85 g. | 85 g. |
| Tamol SN (9) | 17 g. | 17 g. |
| Ferrous sulfate (10% Solution) | 8 g. | 8 g. |

The contents of the reactor were heated to 45°–50° C., the reactor was purged with nitrogen once, and with ethylene twice to 10 psi. followed by the addition of:

|  | Example I | Example E |
|---|---|---|
| Vinyl acetate | 400 g. | 400 g. |

The reactor was then pressurized with ethylene to 800 psi. This was followed by the addition of the following initial catalyst solution:

|  | Example I | Example E |
|---|---|---|
| Water (deionized) | 200 g. | 200 g. |
| Ammonium persulfate | 13 g. | 13 g. |

The polymerization was initiated by adding an activator solution at a rate of 5 g/min. which was made up as follows:

|  | Example I | Example E |
|---|---|---|
| Water (deionized) | 1500 g. | 1500 g. |
| Hydrosulfite AWC (3) | 50 g. | 50 g. |

The polymerization initiated within 5 minutes as indicated by a rise in reactor temperature.

The following monomer emulsion, prepared previously was then added gradually by means of an addition pump at a rate of 43 g/min. over a 3 hour period.

|  | Example I | Example E |
|---|---|---|
| Water (deionized) | 4000 g. | 4000 g. |
| Emcol K8300 (2) | 250 g. | 250 g. |
| Monoethyl maleate | 140 g. | 140 g. |
| Ammonium hydroxide (28%) | 9 g. | 9 g. |
| Vinyl acetate | 8300 g. | 8300 g. |
| Triallyl cyanurate | 1 g. | 1 g. |
| Ammonium persulfate | 100 g. | 100 g. |

The temperature of the reactor content was allowed to rise to 55° C. and was maintained there by the addition of the above mentioned activator solution as needed. At this point the ethylene pressure rose to 900 psi and was maintained there by setting the ethylene supply valve to 900 psi for Example E and to 1100 psi for Example I. A total of 1500 g for Example I and 881 g for Example E of the activator solution was used.

After 3–3½ hours, when all the monomer emulsion and activator solution had been added to the reactor the following finishing catalyst solution was added:

|  | Example I | Example E |
|---|---|---|
| Water (deionized) | 400 g. | 200 g. |
| Ammonium persulfate | 25 g. | 20 g. |
| T-butyl hydroperoxide | 15 g. | 5 g. | followed by addition of the following finishing activator solution:

|  | Example I | Example E |
|---|---|---|
| Water (deionized) | 400 g. | 200 g. |
| Hydrosulfite AWC (4) | 20 g. | 10 g. |

The temperature of the batch was maintained at 60° C. for an additional hour after which the free vinyl acetate monomer concentration had fallen below 1%. The polymer emulsion was then cooled to 30° C. and the ethylene vented from the reactor to ambient pressure. The following solution was then added to the batch:

|  | Example I | Example E |
|---|---|---|
| Water (deionized) | 500 g. | 500 g. |
| Triton X 405 (8) | 85 g. | 85 g. |
| Ammonium hydroxide (28%) | 50 g. | 50 g. |

The ethylene-vinylacetate copolymer emulsions had the following properties:

|  | Example I | Example E |
|---|---|---|
| solids (30 min at 130° C. drying) | 44.6% | 42.3% |
| pH | 7.4 | 6.8 |
| viscosity (Brookfield at 50 RPM) | 41.6 cps | 30.4 cps |
| intrinsic viscosity. (measured in N-methylpyrrolidone at 30° C.) (6) | 1.50 dl/g | 1.56 dl/g |
| particle size (by light transmission (40) | 0.13 microns | 0.13 microns |
| ethylene content of the copolymer | 18.5% | 8.8% |

Notes:
(8) Triton X 405 is a 70 percent solution in water of an octylphenoxypolyethoxyethanol containing 30 moles of oxyethanol per mole of octyl phenol. It is supplied by the Rohm & Haas Company.
(9) Tamol SN is a dispersant supplied by the Rohm & Haas Company.
(10) The particle size was measured by light transmission using a Coulter Counter.

EXAMPLE 6

Polymer emulsions were prepared containing an interpenetrating network of vinylacetate-ethylene copolymer and varying amounts of polystyrene.

The following was charged to a 1 liter glass reactor equipped with a variable agitator, temperature control system, feedpumps, and a water bath for heating and cooling:

|  | Ex. B | Ex. C | Ex. D |
|---|---|---|---|
| Airflex 100 HS (11) | 1819.8 g | 1611.3 g | 1392.2 g |
| Water (deionized) | 474.4 g | 568.7 g | 361.2 g |
| Emcol K8300 (2) | 7.3 g | 14.7 g | 21.7 g |
| Triton X 405 (8) | 4.4 g | 8.8 g | 13.0 g |
| Sipomer DS 10 (12) | 1.6 g | 1.6 g | 4.8 g |
| Monoethyl maleate | 1.2 g | 2.4 g | 3.6 g |
| Styrene | 112.2 g | 223.3 g | 330.6 g |
| Divinyl benzene | 0.12 g | 0.22 g | 0.32 g |
| Ammonium persulfate | 1.9 g | 3.8 g | 5.7 g |
| t-Butyl hydroperoxide | 0.5 g | 0.9 g | 1.4 g |

The batch was heated to 55° C., after equilibration the following activator solution was added:

| | | | |
|---|---|---|---|
| Water (deionized) | 4.9 g | 9.7 g | 14.4 g |
| Hydrosulfite AWC (3) | 1.0 g | 2.0 g | 2.9 g |

After leaving the batch at 80° C. for 2–5 hours it was then cooled to room temperature and the following solution was added:

|  | Ex. B | Ex. C | Ex. D |
|---|---|---|---|
| Water | 26.1 g | 26.1 g | 26.1 g |
| Triton X 405 (8) | 13.2 g | 13.2 g | 13.2 g |
| Ammonium hydroxide (28%) | 9.4 g | 9.4 g | 9.4 g |
| Formaldehyde (37%) | 0.7 g | 0.7 g | 0.7 g |
| Proxel GXL (13) | 1.4 g | 1.4 g | 1.4 g |

The interpenetrating network containing emulsions had the following properties:

|  | Ex. B | Ex. C | Ex. D |
|---|---|---|---|
| solids (30 min at 130° C. drying) | 45.5% | 45.3% | 45.4% |
| pH | 5.2 | 7.9 | 4.9 |
| viscosity (Brookfield at 50 RPM) | 49.6 cps | 53.6 cps | 37.6 cps |
| intrinsic viscosity (measured in N-methyl pyrrolidone at 30° C.) (6) | 1.14 dl/g | 0.99 dl/g | 1.24 dl/g |
| particle size (10) | 0.16 microns | 0.18 microns | 0.19 micron |
| free styrene | 0.01% | 0.11% | 0.26% |
| total polystyrene content | 10% | 20% | 30% |

Notes:
(11) Airflex 100 HS is a vinyl acetate-ethylene copolymer emulsion having an approximate ethylene content of about 15%. It is supplied by Air Products and Chemicals Corp.
(12) Sipomer DS 10 is a brand of sodium dodecyl benzene sulfonate supplied by the Alcolac Chemical Co.
(13) Proxel GXL is a biocide supplied by ICI.

Example 7

Polymer emulsions were prepared containing an interpenetrating network of vinyl acetate-ethylene (from Example 6) and varying amounts of polystyrene.
The following was charged to a 1 liter glass reactor equipped with a variable agitator, temperature control system, feedpumps, and a water bath for heating and cooling:

|  |  | Ex. F | Ex. G | Ex. H | Ex. J | Ex. K | Ex. L |
|---|---|---|---|---|---|---|---|
| Vinyl acetate-ethylene copolymer | (Ex. E) | 277.3 g | 251.4 g | 225.7 g | — | — | — |
|  | (Ex. I) | — | — | — | 264.9 g | 240.8 g | 208.8 g |
| Water (deionized) |  | 1.4 g | 3.0 g | 4.7 g | 1.4 g | 13.3 g | 22.3 g |
| Monoethyl maleate |  | 0.1 g | 0.3 g | 0.4 g | 0.1 g | 0.2 g | 0.3 g |
| Styrene |  | 13.1 g | 27.2 g | 41.1 g | 12.4 g | 26.8 g | 39.8 g |
| Divinyl benzene |  | 0.01 g | 0.03 g | 0.04 g | 0.01 g | 0.03 g | 0.04 g |
| Ammonium persulfate |  | 0.2 g | 0.3 g | 0.8 g | 0.2 g | 0.4 g | 0.6 g |
| t-Butyl hydroperoxide |  | 0.1 g | 0.1 g | 0.2 g | 0.1 g | 0.2 g | 0.3 g |

The batch was heated to 55° C., after equilibration the following activator solution was added:

|  | Ex. F | Ex. G | Ex. H | Ex. J | Ex. K | Ex. L |
|---|---|---|---|---|---|---|
| Water (deionized) | 5.0 g | 13.0 g | 15.4 g | 10.0 g | 15.0 g | 15.3 g |
| Hydrosulfite AWC (3) | 0.1 g | 0.3 g | 0.3 g | 0.2 g | 0.3 g | 0.3 g |

After initiation which was observed by an increase in temperature, the following emulsifier solution was added over 15 minutes:

|  | Ex. F | Ex. G | Ex. H | Ex. J | Ex. K | Ex. L |
|---|---|---|---|---|---|---|
| Water (deionized) | 2.9 g | 5.8 g | 9.0 g | 2.9 g | 6.0 g | 8.9 g |
| Emcol K8300 (2) | 0.9 g | 1.8 g | 2.8 g | 0.6 g | 1.8 g | 1.9 g |
| Triton X 405 (8) | 0.6 g | 1.1 g | 1.7 g | 0.9 g | 1.3 g | 2.7 g |
| Sipomer DS 10 (12) | 0.2 g | 0.4 g | 0.6 g | 0.2 g | 0.4 g | 0.6 g |

After leaving the batch at 57–58° C. for 2 hours it was then cooled to room temperature and the following solution was added:

|  | Ex. F | Ex. G | Ex. H | Ex. J | Ex. K | Ex. L |
|---|---|---|---|---|---|---|
| Water | 4.1 g | 4.1 g | 4.1 g | 4.1 g | 4.1 g | 4.1 g |
| Triton X 405 (8) | 2.1 g | 2.1 g | 2.1 g | 2.1 g | 2.1 g | 2.1 g |
| Ammonium hydroxide (28%) | 1.5 g | 1.5 g | 1.5 g | 1.5 g | 1.5 g | 1.5 g |
| Formaldehyde (37%) | 0.1 g | 0.1 g | 0.1 g | 0.1 g | 0.1 g | 0.1 g |
| Proxel GXL (13) | 0.2 g | 0.2 g | 0.2 g | 0.2 g | 0.2 g | 0.2 g |

The interpenetrating network containing emulsions had the following properties:

|  | Ex. F | Ex. G | Ex. H | Ex. J | Ex. K | Ex. L |
|---|---|---|---|---|---|---|

-continued

| | Example 7 | | | | | |
|---|---|---|---|---|---|---|
| solids (30 min at 130° C. drying) | 42.7% | 42.7% | 42.3% | 44.5% | 45.5% | 45.5% |
| pH | 5.3 | 7.0 | 6.0 | 5.45 | 5.3 | 5.4 |
| viscosity (Brookfield at 50 RPM) | 27.2 cps | 32.0 cps | 138.4 cps | 39.2 cps | 36.0 cps | 37.6 cps |
| intrinsic viscosity (measured in N-methyl pyrrolidone at 30° C.) (6) | 1.85 dl/g | 1.25 dl/g | 1.24 dl/g | 1.64 dl/g | 1.38 dl/g | 1.31 dl/g |
| particle size, microns (10) | 0.15 | 0.21 | 0.21 | 0.15 | 0.19 | 0.21 |
| free styrene | 0.48% | 0.61% | 0.58% | 0.33% | 0.35% | 0.85% |
| polystyrene content | 10% | 20% | 30% | 10% | 20% | 30% |

EXAMPLE 8

A series of paper coating formulations were made with vinylacetate-ethylene copolymer emulsions (Example 5) and with the same copolymer emulsions after a second stage polymerization with styrene to form an interpenetrating polymer network (IPN) of the copolymer emulsion with polystyrene (see Examples 6 and 7). Three basic vinylacetate-ethylene (VAE) emulsions were used as follows: a commercial product, Airflex 100HS sold by Air Products and Chemicals Corp., containing about 15% ethylene and with a Tg of +5° C.; an emulsion containing 8.8% ethylene (Example E) and with a Tg of 15° C.; and an emulsion containing 18.5% ethylene (Example I) and with a Tg of 0° C. All three VAE copolymer emulsions were further swelled by styrene monomer and polymerized as described in Examples B-D, F-H and J-L (Examples 6 and 7). The particle sizes and of the VAE and IPN emulsions are summarized as follows in Table 3:

TABLE 3

| Example | Emulsion Description | Particle Size (1) |
|---|---|---|
| A | Airflex 100 HS (15% Ethylene) | 0.160 um |
| B | with 10% Styrene | 0.162 um |
| C | with 20% Styrene | 0.182 um |
| D | with 30% Styrene | 0.192 um |
| E | VAE with 8.8% Ethylene | 0.134 um |
| F | with 10% Styrene | 0.148 um |
| G | with 20% Styrene | 0.205 um |
| H | with 30% Styrene | 0.292 um |
| I | VAE with 18.5% Ethylene | 0.127 um |
| J | with 10% Styrene | 0.149 um |
| K | with 20% Styrene | 0.191 um |
| L | with 30% Styrene | 0.207 um |

All emulsions of Examples A thru L were made into paper coating formulas of the following dry composition:

| | Dry Weight (gms.) |
|---|---|
| Kaolin Clay | 350.0 |
| Anionic Dispersant | 5.3 |
| Ethoxylated Starch | 7.0 |
| Emulsion from Examples A-L | 18.9 |

As in standard paper coating formulation, the clay (ground clay, 92-94% finer than 2 microns) and dispersant (Dispex N-40 from Allied Corporation) were ground together in a Kady Mill at 70% solids for 30 minutes. Separately the starch (Penford Gum 280 from Penick & Ford Ltd.) was slurried at 25% solids and cooled at 190° F. for 20 minutes. This starch mix was added to the clay and dispersant mix and agitated. The polymer emulsions were then added to this composite mix and the coating formulation diluted to 64% solids for coating.

The relative performance of a paper in a printing press can be simulated in various laboratory tests. Offset printing is demanding on paper coatings. The coating is first wet with a water/alcohol solution and then printed with a thick, tacky ink. The multi-color printing there may be four or five applications in less than a second on a high speed press.

A 50#/ream groundwood-free base sheet was coated with 8# dry coat weight (CIS, coated on one side) on a bench paper coater made by Modern Metalcraft Company. This coated paper was then calendered 2 nips at 150° F. under a 600 pli pressure in a cotton/steel calender. After conditioning 24 hours under standard paper test conditions the paper coatings were tested for sheet gloss, smoothness, porosity, pick strength, Adam wet rub resistance, printed ink gloss and SIWA brightness. Sheet gloss, smoothness and porosity showed little variation between the vinylacetate-ethylene (VAE) emulsions and the interpenetrating polymer network (IPN) emulsions formed by the second stage polymerization with styrene.

The effect of the second stage polymerizations in forming the IPN emulsions was apparent in pick strength, Adam wet rub resistance, printed ink gloss, and SIWA brightness tests. The results are as follows:

TABLE 4

| | IGT Pick Strength (3) | Adam's Wet Rub (4) | 75° Ink Gloss (5) | SIWA (6) Brightness |
|---|---|---|---|---|
| A | 22 | 72 | 96 | 51.5 |
| B | 28 | 136 | 97 | 49.6 |
| C | 23 | 190 | 96 | 53.3 |
| D | 22 | 196 | 91 | 55.5 |
| E | 22 | 72 | 96 | 51.5 |
| F | 29 | 124 | 96 | 49.8 |
| G | 22 | 126 | 91 | 52.2 |
| H | 16 | 390 | 81 | 59.5 |
| I | 20 | 165 | 92 | 52.3 |
| J | 26 | 111 | 96 | 54.0 |
| K | 25 | 155 | 94 | 56.1 |
| L | 22 | 219 | 91 | 61.3 |

An additional evaluation compares the IPN emulsion with physical blends of an equivalent composition (i.e. blend of the vinylacetate-ethylene copolymer with a corresponding level of polystyrene). The blends are designated with an (').

TABLE 5

| | IGT Pick Strength (14) | Adam's Wet Rub (15) | 75° Ink Gloss (16) | SIWA (17) Brightness |
|---|---|---|---|---|
| H(IPN) | 16 | 390 | 81 | 59.5 |
| H'(Blend) | 13 | 206 | 81 | 56.3 |
| J(IPN) | 26 | 111 | 96 | 54.0 |
| J'(Blend) | 26 | 251 | 91 | 58.9 |
| L(IPN) | 22 | 219 | 91 | 61.3 |
| L'(Blend) | 13 | 296 | 80 | 58.9 |

In all cases the second styrene polymerization forming the IPN emulsion increased the IGT pick strength. In fact, levels of about 10% styrene produced a maximum coating strength in all three vinylacetate-ethylene systems. Increasing from 10% to 30% styrene reduced pick strength back to the level of the original vinylacetate-ethylene emulsion probably due to the increased particle size at higher styrene levels. Both particle size and polymer composition affect paper coatings. Generally, with a given polymer composition, smaller polymer particle sizes will produce higher strength paper coatings. Here, for the various IPN polymers the particle size/strength relationship is not clear because of the differing polymer compositions. However, it is clear that the second polymerization of the IPN polymers increased the paper coating strength since even though the particle size increased, the IGT peek strength was greater than in the non-IPN polymer paper coatings.

Adam's wet rub results deteriorated with increasing styrene levels for Examples A–D and E–H but showed improvement in Examples J and K. Ink gloss (75°) also showed increases at lower levels of styrene, but a subsequent decrease in gloss at higher styrene levels. SIWA brightness increased with increasing styrene levels, with two systems decreasing slightly at low styrene levels, but increasing rapidly with further increases of styrene levels. In the above Examples IPN emulsions containing 10% styrene produced peak values in IGT strength and ink gloss.

Blending a polystyrene emulsion with the vinylacetate-ethylene copolymer emulsion did not produce the same results as forming an IPN emulsion with polystyrene in a second phase polymerization. The differences (shown in Table 5) are most pronounced in IGT pick strength, Adam's wet rub and 75° ink gloss. These are the three most important measures for predicting offset press runnability of coated papers and the improvements show the potential value of this invention on paper coating applications. Importantly this IPN emulsion can deliver excellent performance at a low cost since the starting materials are relatively low cost polymers.

What is claimed is:

1. A paper or paperboard coating composition comprising: a pigment, a binder and an aqueous polymer emulsion containing a first polymer network which is crosslinked and which is mixed and intertwined on a molecular scale with a second polymer network wherein the second polymer differs from the first polymer and the first polymer comprises 5 to 95% on a solids by weight basis of the emulsion and the monomers of the first polymer and the second polymer are not readily copolymerizable.

2. Composition of claim 1 wherein the coating composition further comprises a dispersant for the pigment.

3. Composition of claim 1 wherein the first polymer network contains a polymer chosen from the group consisting of polyethylene, polyester, polyurethane, polyvinyl acetate, vinylacetate-ethylene copolymer, vinylchloride-ethylene copolymer, polyvinylpropionate and vinylacetate-acrylic copolymer and the second polymer network is chosen from the group consisting of polystyrene, polymethyl methacrylate, polyacrylonitrile, polybutylacrylate, polybutadiene, styrene-butadiene copolymer, acrylonitrile-acrylate copolymer and styrene-acrylic copolymer.

4. Composition of claim 3 wherein the first polymer network contains a vinylacetate-ethylene copolymer and the second polymer network contains styrene.

5. Composition of claim 4 wherein the second polymer network comprises 5 to 40% on a solids by weight basis of the emulsion.

6. Composition of claim 2 wherein the pigment is chosen from the group consisting of clay, titanium dioxide and calcium carbonate.

7. Composition of claim 2 wherein the binder is chosen from the group consisting of proteins, resins, polyvinyl alcohol, alginates and starches.

8. A paper or paperboard coating composition comprising a pigment, a binder and an aqueous polymer emulsion prepared by the process comprising:
   a) forming a first polymer emulsion which is crosslinked;
   b) mixing a second monomer with the first polymer emulsion whereby an emulsion mixture of the first polymer emulsion and a second monomer emulsion is obtained;
   c) allowing the emulsion mixture to equilibrate; and
   d) then polymerizing the emulsion mixture providing a first polymer network which is mixed and intertwined on a molecular scale with the second polymer network, wherein the second polymer differs from the first polymer and wherein the monomers of the first polymer and the second polymer are not readily copolymerizable and the first polymer comprises 5 to 95% on a solids by weight basis of the emulsion mixture.

9. Composition of claim 8 wherein the coating composition further comprises a dispersant for the pigment.

10. Composition of claim 8 wherein the first polymer network contains a polymer chosen from the group polyethylene, polyester, polyurethane, polyvinyl acetate, vinylacetate-ethylene copolymer, vinylchloride-ethylene copolymer, polyvinylpropionate and vinylacetate-acrylic copolymer and the second polymer network is chosen from the group consisting of polystyrene, polymethyl methacrylate, polyacrylonitrile, polybutylacrylate, polybutadiene, styrene-butadiene copolymer, acrylonitrile-acrylate copolymer and styrene-acrylic copolymer.

11. Composition of claim 10 wherein the first polymer network contains a vinylacetate-ethylene copolymer and the second polymer network contains styrene.

12. Composition of claim 11 wherein the second polymer network comprises 5 to 40% on a solids by weight basis of the emulsion.

13. Composition of claim 9 wherein the pigment is chosen from the group consisting of clay, titanium dioxide and calcium carbonate.

14. Composition of claim 9 wherein the binder is chosen from the group consisting of proteins, resins, polyvinyl alcohol, alginates and starches.

* * * * *